United States Patent [19]

Penczak et al.

[11] Patent Number: 5,546,717

[45] Date of Patent: Aug. 20, 1996

[54] ACCESS FLOOR TRENCH RACEWAY

[75] Inventors: John P. Penczak, Washington, W. Va.; Edmund B. Kalbfleisch, Bloomingdale, N.J.

[73] Assignee: Walker Systems, Inc., Parkersburg, W. Va.

[21] Appl. No.: 230,979

[22] Filed: Apr. 20, 1994

[51] Int. Cl.$^6$ .................................................. E04C 2/52
[52] U.S. Cl. ........................................... 52/220.5; 174/48
[58] Field of Search ................... 52/220.5, 264, 52/220.1, 220.3; 174/48; 439/215

[56] References Cited

U.S. PATENT DOCUMENTS

| Re. 28,756 | 4/1976 | Fork | 138/92 |
|---|---|---|---|
| Re. 33,220 | 5/1990 | Collier | 52/263 |
| 3,166,633 | 1/1965 | Guzan, Jr. et al. | 52/220.5 |
| 3,204,378 | 9/1965 | Stuessel et al. | 52/220.5 |
| 3,592,956 | 7/1971 | Fork | 174/49 |
| 3,784,042 | 1/1974 | Hadfield et al. | 220/3.3 |
| 3,844,440 | 10/1974 | Hadfield et al. | 220/3.7 |
| 3,886,702 | 6/1975 | Fork | 52/221 |
| 4,016,357 | 4/1977 | Abrahamsen | 174/48 |
| 4,178,469 | 12/1979 | Fork | 174/48 |
| 4,194,332 | 3/1980 | Fork | 52/220 |
| 4,630,417 | 12/1986 | Collier | 52/263 |
| 4,656,795 | 4/1987 | Albrecht et al. | 52/393 |
| 4,676,036 | 6/1987 | Bessert | 52/126.6 |
| 4,850,162 | 7/1989 | Albrecht | 52/126.6 |
| 4,899,506 | 2/1990 | Chapman et al. | 52/221 |
| 5,003,737 | 4/1991 | Penczak | 52/220.5 X |

FOREIGN PATENT DOCUMENTS

| 742882 | 9/1966 | Canada | 52/220.5 |
|---|---|---|---|
| 67134 | 12/1982 | European Pat. Off. | 174/48 |
| 406017524 | 1/1994 | Japan | 52/220.1 |

Primary Examiner—Carl D. Friedman
Assistant Examiner—Yvonne Horton-Richardson
Attorney, Agent, or Firm—McAndrews, Held & Malloy, Ltd.

[57] ABSTRACT

A trench raceway providing multiple wire passages between an undersurface and an access surface. The access surface defines an access passage with opposing first and second access sides. The trench raceway includes a plurality of support pedestals, a trench pan, and an adjustable pan support.

The pedestals provide support to the first and second sides of the access surface. The pedestals include an undersurface support, a floor support having a floor support portion and an access passage portion, and an adjustable central section intermediate the undersurface support and the floor support. The trench pan is adapted to be supported by the first and second access sides of the trench raceway to provide the multiple wiring passageways. The trench pan includes a pan section with a support passage intermediate a first and second flank supported by the access passage portions of the support pedestals. The adjustable pan support provides support for the trench pan and includes an undersurface engaging end, a cover plate engaging end, and a pan support adjuster intermediate the undersurface end and the cover plate engaging end. The pan support is mounted on the pan support passage to support the pan section.

24 Claims, 3 Drawing Sheets

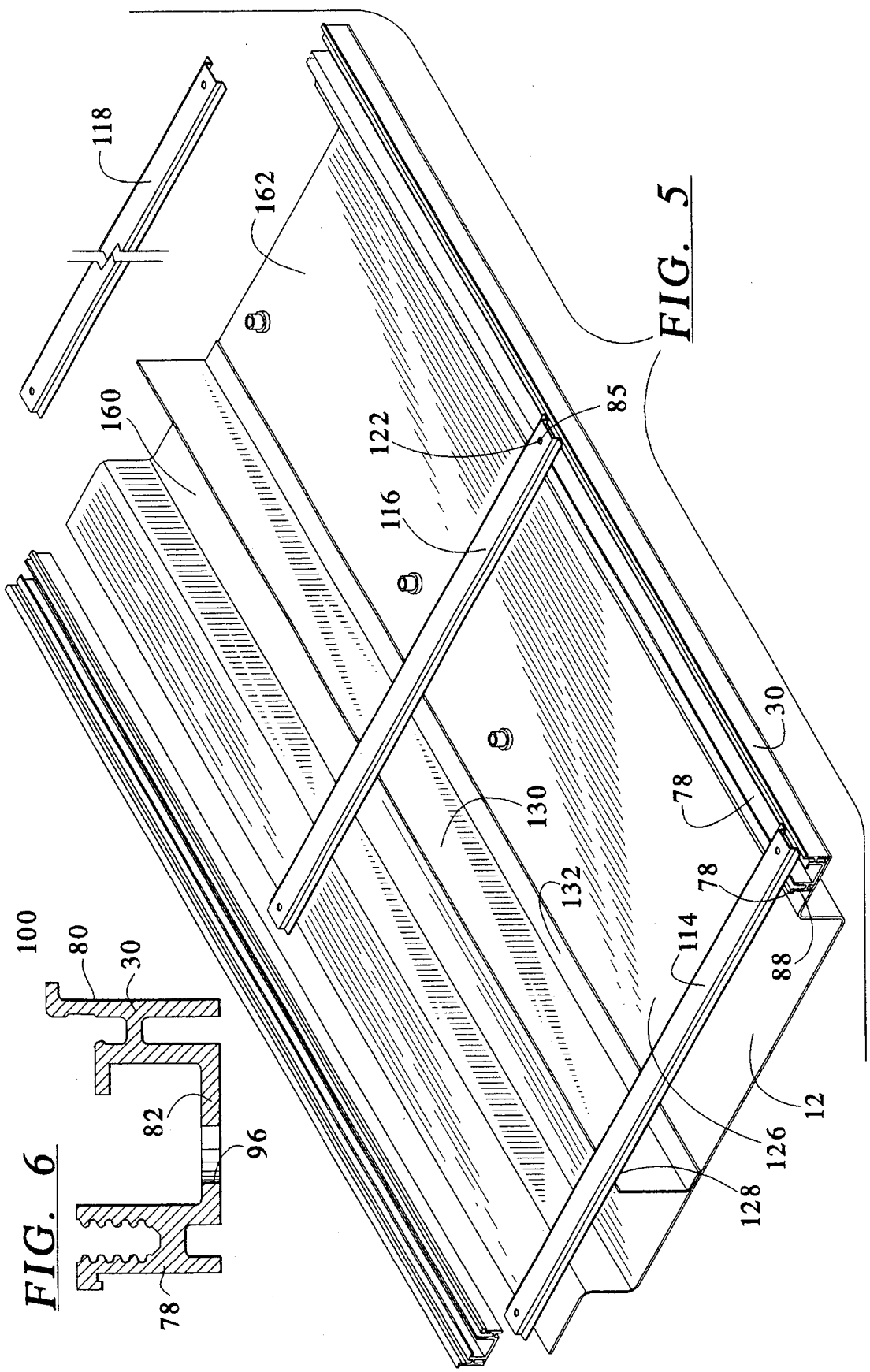

5,546,717

ACCESS FLOOR TRENCH RACEWAY

BACKGROUND

A. Field of the Invention

This invention relates to a trench raceway of the type useable for access flooring for computer rooms and office buildings. More particularly, this invention relates to a trench raceway that is held in place by pedestals adjacent the access floor above a subsurface or subfloor.

B. State of the Art

Computer rooms have long utilized a type of raised flooring to provide the type of electrical security and adaptability of wiring schemes required for sensitive computer equipment. The space between the access floor and the subfloor provides a large, electrically isolated, secure, and relatively easily accessible area for routing, adjusting, and rerouting of computer cable, conduit and other ducting under the access floor. Since computers can be highly sensitive to electrical interference and are often being moved, upgraded, maintained, and changed in the room, such access floors have long been an important aspect of computer room design and construction in many buildings.

One common structure for access floor consists of adjacent rectangular access floor panels suspended above the subfloor by means of a series of adjustable pedestals with planar upper and lower ends. The lower end rests on the subfloor and the upper end supports the bottom sides of an adjacent access floor panels. Removal of an access panel exposes portions of the supporting pedestals for that panel as well as the space under that access floor panel and above the portion of the subfloor below it.

Office buildings having access flooring require wiring paths not only for low voltage computer lines but also for the more traditional types of wiring such as low voltage phone lines and higher voltage power lines. The power lines, in particular, must pass through conduits, ducts, or raceways that are electrically isolated from the computer cables or ducting running within the access area between the access flooring and the subfloor.

One solution has used surface metal raceways above the access flooring, on the upper surface of the flooring itself or along walls in the room. Surface metal raceways are unattractive and can trip persons if located along the flooring itself. They do not hide the raceways as is common and often expected by the tenant, interior designers, etc. They are also typically only light duty solutions and generally do not have significant wire carrying capacity. Indeed, the National Electrical Code limits them to being 20% filled with wiring.

Another solution has been the utilization of the traditional underfloor raceway in the concrete subfloor. Just as in traditional concrete flooring without access flooring above it, this type of raceway is rectangular with access covers over junction boxes set in a depression in the concrete floor so that the covers can be removably secured to the junction boxes, thus providing an accessible wireway passage within the raceway. The raceway can contain internal partitions for maintaining electrical separation of various types of wires (e.g., phone versus power lines) within the raceway.

Since this type of underfloor raceway is located in the subfloor, it is located well below the access floor. In order to access this type of underfloor raceway, the user must: (1) remove a section of the access floor; (2) check to see if the desired raceway is located beneath the flooring; (3) when the desired raceway is discovered, reach through the opening, clear any computer wiring in the way, and then remove the raceway cover and set it aside; and then (4) have to work within the raceway in the subfloor under and separated from the access opening in the access floor.

This underfloor raceway and accessing procedure can be cumbersome, difficult, and time consuming. It also cannot be utilized when an access floor is to be installed above a concrete floor not having a suitable underfloor raceway already pre-installed in the concrete. Even when the concrete subfloor contains pre-existing underfloor raceways with the desired capacity, the location of the raceways may be less than desired at the time the access floor is installed or at some later time when the arrangement of the computers, etc., may be changed in a manner rendering a prior raceway path undesirable.

Other solutions have involved cable trays, metal wireways (conduits), or other ducts installed below the access floor. Often, low voltage wiring (such as computer wiring) may run over or under electrical conduits or ducts at unspecified angles, making routing and location of cables extremely unmanageable. In addition, conduits and other ducts result in additional loading and an increase in height of the access floor, which increases the height of the building. Combined with the weight of the access panel (approximately 10 lbs. per square foot) wireways and ducts can significantly increase the size of the structural framing. This can significantly increase the cost of building the access floor and the building containing the access flooring.

In addition, metal wireways are only useable for exposed electrical work according to the National Electrical Code. They are thus not acceptable under the Code for use in access flooring.

OBJECTS OF THE INVENTION

It is therefore an object of the present invention to provide an improved wire passageway for use with access type flooring or surfaces mounted distal from a subfloor or subsurface.

It is another object of the present invention to provide a wire passageway under the exposed surface of the access floor that can be easily and quickly mounted in existing access flooring structures. Another object is to provide such a wire passageway that is located and accessed for installation or rearrangement of wiring such as power lines, telephone lines, etc.

It is yet another object to provide such a wire passageway that maintains electrical and physical separation of wires such as power or telephone lines from computer or other wiring running under the access floor and above the subfloor.

Another object is to provide such a wire passageway that is relatively shallow and will provide clearance between the raceway and subfloor.

Yet another object is to provide such a wire passageway that will reduce loading of the floor as compared to that provided by underfloor ducting, conduit, or cable trays. Preferably, the passageway reduces loading and enhances ease of access by eliminating use of an access floor panel at the location of the wire passageway.

It is a further object of the present invention to provide a wire passageway that is easily installed with traditional access flooring by simply hanging the passageway, or trench, on existing pedestals or similar supporting structures in existing access flooring.

Yet another object is to provide trench type raceway for access flooring that meets the requirement of the National Electrical Code but is not installed in the subfloor or subsurface under the access floor.

Yet another object is to provide such a raceway that is easy and economical to manufacture, install, and utilize.

Another object is to provide such a raceway that can be installed in an existing access floor flush with the upper surface of the access floor.

A still further object is to provide such a raceway with adjustability so that it can be installed securely and, preferably, in a variety of differing types access floor constructions.

An additional object of the present invention is to provide a raceway with components that do not require precise location of screws or other fasteners in order to mount the raceway securely adjacent the access floor.

Another object is to provide a raceway capable of including one or more partitions that divide the raceway into electrically and physically separated wireway passages.

Another object is to provide a trench type raceway for access flooring with a cover or roof on the raceway that is resiliently mounted to prevent excessive noise when the floor is walked upon.

Yet another object is to provide a trench type raceway for access flooring with traditional access openings or slots that are usually either 18" or 24" wide.

A still further object is to provide a trench type raceway for access flooring that provides adequate sound deadening properties and is electrically insulated and isolated from the surrounding access floor.

There are other objects and advantages. They will become apparent as the specification proceeds.

SUMMARY OF THE INVENTION

The foregoing and other objects and advantages are achieved by our invention of an access floor trench raceway. The trench raceway is separated by a substantial distance from an undersurface below an access floor. It has a trench pan supported by at least a first adjustable pedestal (preferably of the type commonly used on existing access floor assemblies) that engages the trench pan and the undersurface to bias the trench pan away from the undersurface and toward the access floor. Preferably, the trench raceway is also supported by at least one other pre-existing adjustable pedestal with the first pedestal mounted adjacent one side of the trench and the other pedestal mounted adjacent the opposing side of the trench pan. The trench raceway also preferably has a cover plate mounted on the trench plate flush with the access surface, an adjustable central post supporting the central area of the trench plate, and shock absorbent caps and trim to provide electrical insulation and reduce noise when the raceway is walked upon.

BRIEF DESCRIPTION OF THE DRAWINGS

The preferred embodiment of the present invention is shown in the accompanying drawings wherein:

FIG. 5 is an exploded perspective view of the trench raceway trench pan with temporary spacer bars, opposing side lip supports, and an electrical partition plate in the pan; and FIG. 6 is a cross-sectional view of a side lip support shown in FIG. 5.

In the following description, spatial orienting terms, such as "lower" and "upper," are used. It should be understood that these terms are used for purposes of explanation of the location and arrangement of components with respect to each other but not necessarily in absolute location in space or with respect to surrounding structure.

DETAILED DESCRIPTION OF THE PREFERRED EMBODIMENT

Figure 1:
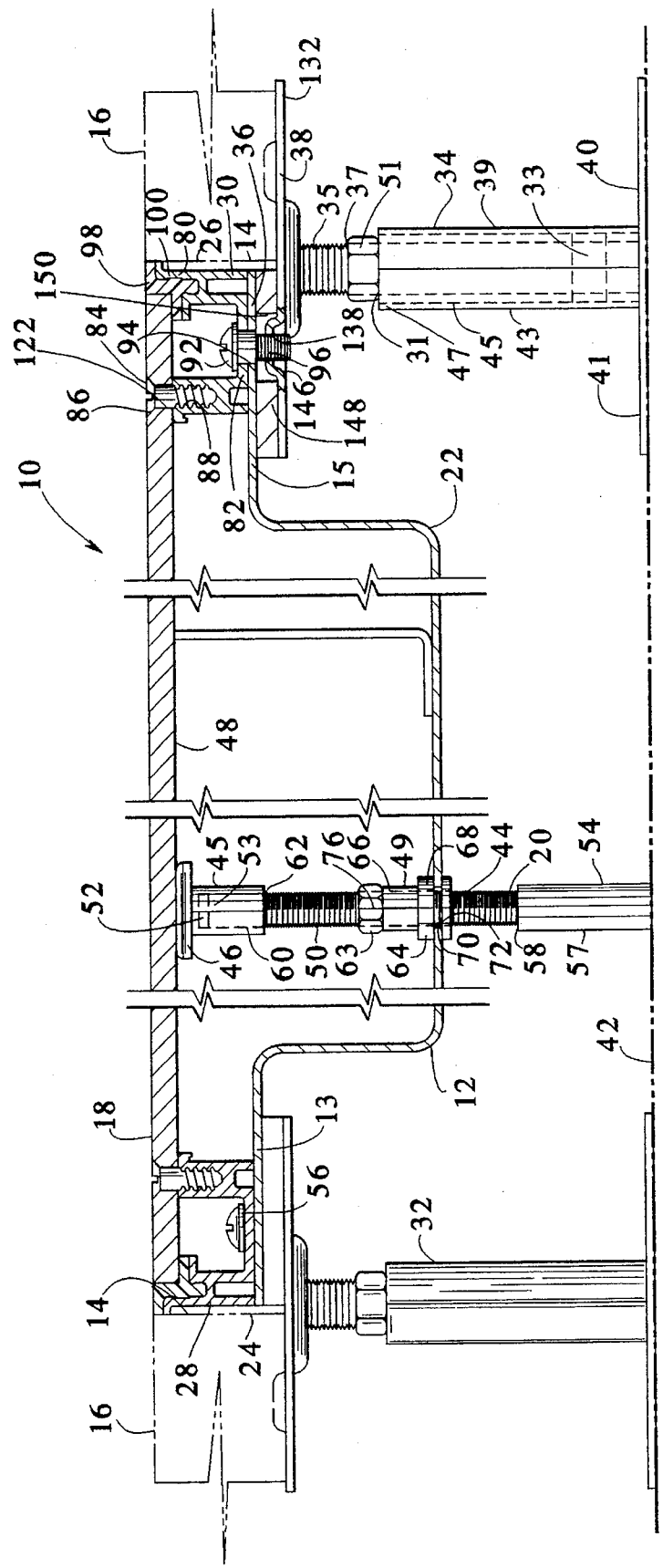
FIG. 1 is a staggered cross-sectional view of the access floor trench raceway taken along staggered section fine 1—1 of FIG. 2.

Referring now to FIG. 1, the applicants' access floor trench raceway, generally 10, consists of a trench pan 12 set in a pre-existing access passage 14 in an access floor 16. The trench pan 12 is covered by a cover plate 18, which is sized to fit within the access passage 14 flush with the upper surface of the access floor 16. The trench pan 12 is supported in the access passage 14 by an adjustable central support post 20. The support post 20 adjustably supports the pan-shaped central section 22 of the trench pan 12 midway between the opposing first 24 and second 26 sides of the access passage 14 in the access floor 16. The trench pan 12 also has opposing first 28 and second 30 lip supports respectively mounted adjacent the first 24 and second 26 sides of the access passage 14.

The first 28 and second 30 lip supports are respectively secured in position by pairs of opposing, pre-existing, adjustable first 32 and second 34 support pedestals. The support pedestals 32, 34 are conventional and, in the preferred embodiment, designed for use with the traditional access floor 16 to support the floor 16 over a subfloor or undersurface 42.

Figure 4:
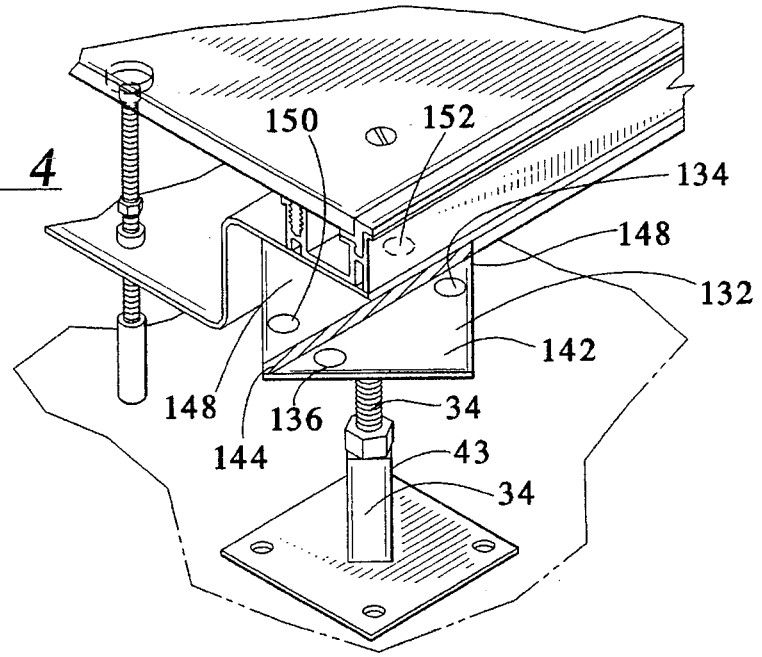
FIG. 4 is a perspective, cross-sectional view of the access floor trench raceway showing a pedestal and a pan support bar to support the trench raceway over an undersurface.

Still referring to FIG. 1, the first 32 and second 34 support pedestals have identical structure. The second support pedestal 34, for example, has a lower end 40 abutting an undersurface 42 and an upper end 38 simultaneously abutting the bottom side 36 of the portion of the trench pan 12 under the first lip support 28 and the bottom side of the access floor 16 adjacent the access passage 14 in the floor 16. A threaded pedestal bolt 37, having an upper threaded section 35 extending from a square bolt head 33, interconnects the upper 38 and lower 40 ends of the second pedestal 34. The lower end 40 has: (A) a lower T-shaped pedestal base 39, which has a planar base 41 abutting the undersurface 42; and (B) a pedestal support 43 welded to the planar base 41 and extending perpendicularly upwardly from the base 41. The pedestal support 43 is, as shown in FIG. 4, square in cross-section and has, as shown in FIG. 1, a square pedestal rod passage 45 penetrating its upper end 47 and adapted to slidingly receive the square bolt head 33 of the pedestal bolt 37. A hex nut 51 threaded onto the threaded section 35 of the rod 37 abuts the uppermost edge 31 of the pedestal support 43 and maintains the height of the upper end 38 of the second support pedestal 34 with respect to the undersurface 42. The height of the support pedestals, e.g., 34, is thus adjusted by turning the hex nut 51 to change the height of the pedestal rod 37 with respect to the pedestal support 43.

Still referring to FIG. 1, the adjustable central support post 20 penetrates a support post passage 44 in the central portion 22 of the trench pan 12. The central post 20 has a lower base 54 abutting the undersurface 42, an upper support column 45 capped with a resilient, shock absorbent upper cap 46 abutting the underside 48 of the cover plate 18, and a trench pan support 49 intermediate the lower base 54 and upper cap 46. The lower base 54 has a lower column support 57 terminating in an upper step or neck portion 58. The threaded central support rod 50 extends upwardly from the step 58.

The upper support column 45 has a threaded column passage 60. The upper end 62 of the central support rod 50 is threaded into the column passage 60.

The trench pan support 49 consists of a hex nut 63 and a lower support rivnut 64 having a threaded rivnut passage 66 along its axial length. The rivnut 64 has a lower T-shaped end 68 with an outer radial slot 70 adapted to receive, retain, and support in position with respect to the support 49 and undersurface 42, the interior lip or edge 72 of the support post passage 44 in the trench pan 12. The central support rod 50 is threaded through the rivnut passage 66 to maintain the desired height of the trench pan's central section 22 with respect to the undersurface 42; and the hex nut 63 is threaded onto the support rod 50 to abut and lockingly engage the upper axial end 76 of the support rivnut 64.

The support rod 50 has a screw driver slot 52 at its upper end 53. An installer can thus turn the support rod 50 with a screw driver to adjust the height of the pan support 49 with respect to the under-surface 42.

Figure 2:
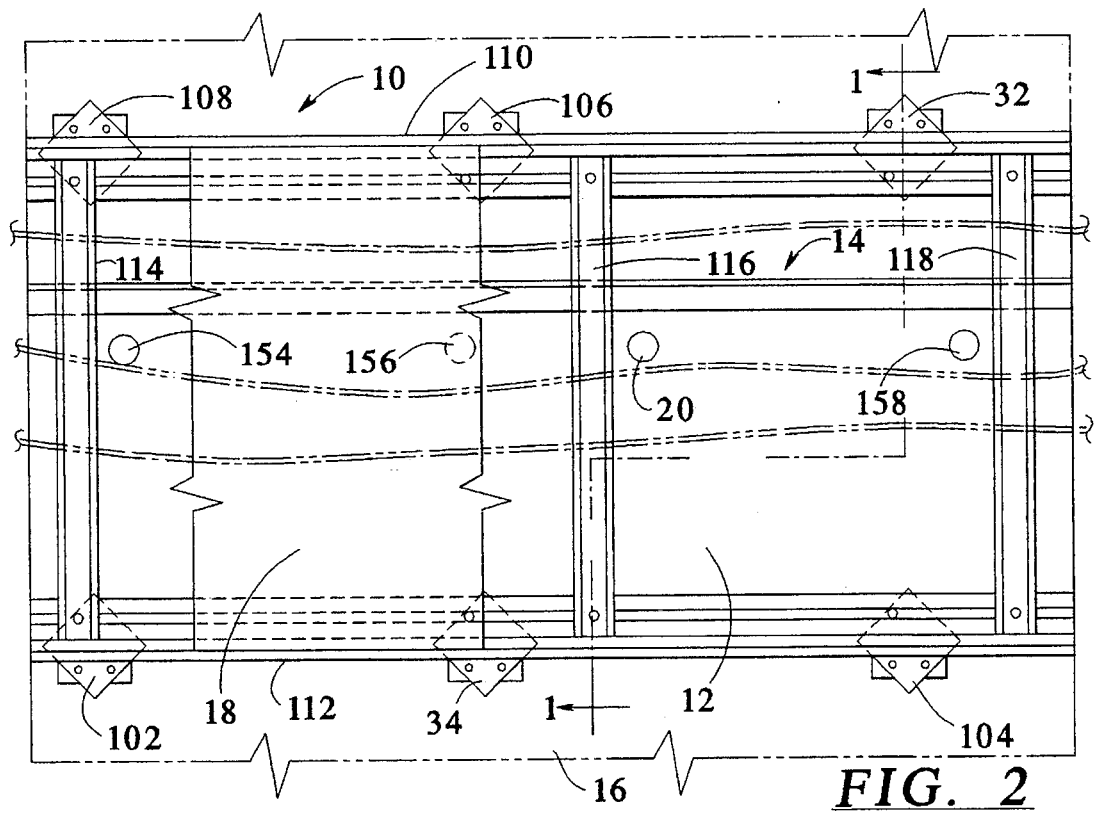
FIG. 2 is an upper elevational view of a partially assembled access floor trench raceway.

The central support post 20 is thus adjustable both at its upper capped end 46 and at the trench support 49. In this manner, the installer can adjust both: (1) the distance between (a) both the upper cap 46 and the trench pan support 49 and (b) the undersurface 42; and (2) the distance between the trench pan support 49 and the undersurface 42. As shown in FIG. 2, the trench raceway 10 preferably has a series of such central support posts 154, 156, 20, 158 mounted in, and supporting, the axial center of the trench pan 12 at spaced intervals along the axial length of the pan 12.

With continuing reference to FIG. 1, the first 28 and second 30 lip supports each have the same structure. As shown in FIG. 6, for example, the second lip support 30 is generally U-shaped. The lip support 30 has an upwardly extending fastener arm 78, an upwardly extending access floor abutment arm 80, and a transverse section 82 interconnecting the fastener arm 78 and abutment arm 80.

Figure 3:
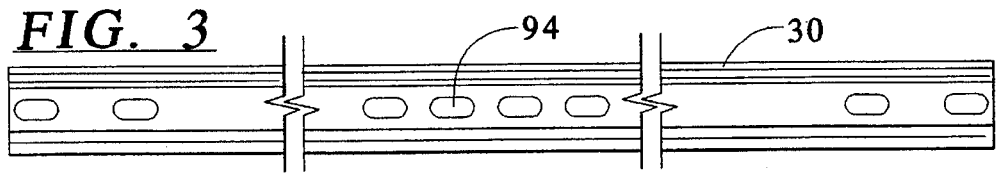
FIG. 3 is a plan view f a pan support bar such as shown FIG. 2.

As shown in FIG. 1, a cover plate screw 84 penetrates a cover plate screw passage 86 in the cover plate 18 and lockingly threads into a cooperatively threaded fastener arm screw passage or continuous slot 88 in the lip support 30. A self-threading pedestal screw 92 passes first through a plastic insulator 56 penetrating a pedestal screw passage, or (as shown in FIG. 3) oval shaped slot, 94 in the transverse section 82 to lockingly thread into a matingly threaded pedestal bolt hole 96 in the upper end 38 of the first support pedestal 34. A plastic insulator 56 electrically insulates raceway 10 from pedestal assembly 32, 34.

Finally, a shock absorbent, electrically insulating resilient lip 98 is mounted on the upper end 100 of the abutment arm 80. This resilient lip 98 is described in detail in U.S. Pat. No. 5,003,737, entitled "Side Rail For Trenchduct," the disclosure of which is incorporated herein by reference.

Referring again to FIG. 2, the trench raceway 10 is held in place with respect to the access floor 16 (shown in phantom) by a series of pre-existing support pedestals 102, 34, 104, 108, 106, 32 supporting the access flooring. The pedestals 108, 106, 32 on the first side 110 of the access passage 14 are generally opposed from but aligned parallel to the pedestals 102, 34, 104 on the second side 112 of the access passage 14.

During installation of the raceway and prior to (as shown in FIG. 1) placing the cover pate 18 over the raceway 10, the spacer bars 114, 116, 118 are mounted in the access passage 14 transverse to the axis of the passage 14. As shown in FIG. 5, the spacer bars 114, 116, 118 rest on the fastener arms, e.g., 78, of the lip supports, e.g., 30. Each spacer bar, e.g., 116, has spacer screw passage 122 at each end of the bar 116. A spacer screw 85 penetrates this screw passage 122 to thread into the fastener screw passage 88 in the fastener arm 78 of the lip support 30. In this manner, the spacer bars 114, 116, 118 maintain, as shown in FIGS. 2 and 5, uniform and parallel separation of the lip supports 28, 30 in, and against the sides 110, 112 of, the access passage 14 during installation of the raceway 10. The installer removes these spacer bars 114, 116, 118 when the cover plates, e.g., 18, are installed and thus provide the spacing support previously provided by the spacer bars 114, 116, 118.

With continuing reference to FIG. 5, the trench pan 12 has an L-shaped electrical separation panel 130 extending upwardly from the trench pan base 126 to abut the bottom side, e.g., 128, of the spacer bars, e.g., 114. The lower leg 132 of the separation panel 130 is spot-welded to the trench pan base 126.

Referring now to FIG. 4, the structure of the support pedestals, e.g., 34, is shown in additional detail. A rectangular and somewhat planar upper pedestal base 132 is rigidly secured to the upper end of the pedestal rod 37. The pedestal base 132 has four threaded pedestal bolt passages 134, 136, 138, 140 (138 and 140 not shown in FIG. 4), with two of the passages 134, 136 within the perimeter of one triangular half-section 142 of the pedestal base 132 and the other two passages 138, 140, within the perimeter of the other triangular half-section 144 of the pedestal base 132.

As shown in FIG. 1, the bolt passages, e.g, 138, are formed in a detent 146 pressed in the pedestal base 132. As shown in FIG. 4, the lowermost side of a triangular plastic shock separator/insulator 148 abuts the pedestal base 132 and the uppermost side of the insulator 148 abuts the lip support 30. The insulator 148 has two detent holes 150, 152 that align the insulator 148 between the lip support 30 and the upper pedestal base 132. As shown in FIG. 1 for one detent 146, the detent 146 provides this alignment by penetrating the detent hole 150 in the insulator 148.

Referring now back to FIG. 1, in the preferred embodiment 10, the cover plate 18 is made of ¼" (for 10" unsupported spans) to ³⁄₁₆" (for 18" unsupported spans) steel plate; the trench pan 12 is made of 14 gauge galvanized steel, the lip support 30 is made of extruded aluminum, and the resilient lip 98 is made of rigid co-extrusion vinyl. The upper cap 46 is made of nylon and the insulator 148 is made of Lexan. The remaining parts are made of suitable steel or other rigid material.

It can therefore be seen that the present trench raceway 10 provides an improved wire raceway for use with pre-existing access type flooring 16 or other surfaces mounted distal from a ceiling, wall, floor or subsurface 42. The raceway 10 is easily dropped into place in pre-existing access flooring 16 and hung from the existing support pedestals 32, 34. The raceway 10 is also very easily accessed for installation and rearrangement of wiring within it; and the raceway 10 maintains electrical and physical separation of certain wires, such as power or telephone lines, from computer or other wiring running under the access floor and above the subfloor. It also can provide separate wireway channels 160, 162 within the raceway 10 itself.

The raceway 10 is relatively shallow and provides ample clearance for power, telephone, or other wiring to pass between the undersurface 42 and the central section 22 of the trench pan. It 10 does so while eliminating the need for any access floor panel at the location of the access passage 14 in the floor. At the same time, because of the raceway's 10 easy adjustability, it can be installed in traditional access flooring 16, flush with the upper surface of the floor 16, without modification of the floor 16, and in conformance with the National Electrical Code. The raceway 10 accomplishes this adjustability without requiring the precise location of screws or other fasteners in order the mount the raceway 10 securely in an access floor 16.

The raceway 10 is also resiliently mounted, via the upper cap 46, resilient lip 98, and insulator 148, to maintain electrical insulation and prevent excessive noise when the floor is walked upon. Additional such insulation and sound-deadening devices could be added in other areas, such as between the support pedestals 32, 34 and undersurface 42 and between the central post 20 and undersurface 42. The raceway 10 is also very easy and economical to manufacture, utilize, and install. In this regard, the raceway 10 provides ready access to the wires running in the raceway 10 itself. The other wiring, such as that running under the raceway 10, can be accessed through adjacent access floor panels without removing the raceway 10.

Although the applicants have described their preferred embodiment in detail, it is to be understood that the scope of the invention is determined according to the following claims.

What is claimed is:

1. A trench raceway providing multiple wire passages between an undersurface and an access surface having an access passage with opposing first and second access sides, the access passage providing access to an intermediate area between the undersurface and access surface, the trench raceway comprising:
    A. at least a first and a second pedestal, each of which has (i) an undersurface support engaging the undersurface, (ii) a floor support having a floor support portion and an access passage portion, and (iii) an adjustable central section intermediate the undersurface support and the floor support, the floor support portion of the first floor support abutting the first access side of the access surface, and the floor support portion of the second floor support abutting the second access side of the access surface; and
    B. a trench pan having a pan section intermediate a first flank opposite a second flank, the first flank of the trench pan being supported by the access passage portion of the first floor support, the second flank of the trench pan being supported by the access passage portion of the second floor support, the pan section of the trench pan further having a pan support passage centrally disposed in the pan section; and
    C. an adjustable pan support having (i) an undersurface engaging end, (ii) a cover plate engaging end, and (iii) a pan support adjuster intermediate the undersurface engaging end and the cover plate engaging end and mounted in the pan support passage to supportingly engage the pan section of the trench pan.

2. The trench raceway of claim 1 wherein the combination also comprises a cover plate mounted on the trench pan flush with the access surface.

3. The trench raceway of claim 2 wherein the first and second flanks respectively provide means for hanging the trench pan from and between the first and second floor supports.

4. The trench raceway of claim 1 comprises a removable spacer bar spanning between the first and second flanks of the trench pan to maintain a predetermined separation of the first and second flanks during installation of the trench pan in the access floor.

5. The trench raceway of claim 4 wherein the first and second adjustable pedestals, the first and second flanks of the trench pan, and pan support each include shock absorbent portions whereby shock delivered to the access floor or cover plate is dampened prior to transmission of the shock through either the pedestals, trench pan sides, or pan support to the trench pan or undersurface.

6. The trench raceway of claim 1 wherein the depth of the trench pan is less than the distance between the access surface and the undersurface to provide at least a first wire passage between the pan section and the undersurface and a second wire passage within the interior of the pan section of the trench pan.

7. A trench raceway for use with an access floor of the type supported above an underfloor by a plurality of support pedestals, the access floor defining an access passage having first and second opposing access sides, the support pedestals including first and second sets of pedestals aligned along the first and second sides of the access passage, respectively, each pedestal in the first and second sets of pedestals includes a floor support portion underlying and supporting the access floor and an access portion extending into the access passage, the trench raceway comprising:
    a trench pan adapted to be positioned in the access passage and supported by the first and second set of support pedestals positioned adjacent to the first and second access sides, the trench pan having a first side wall and a second side wall with a lower and upper edge and a pan section extending between the lower edges of the first and second side walls, each side wall having a respective lip support section extending outwardly from its upper edge adapted to overlay and be supported by the access passage portions of the first and second sets of support pedestals.

8. The trench raceway of claim 7 wherein the pan section includes at least one support passage centrally disposed in the pan section of the trench pan and wherein the trench raceway further comprises at least one pan support post having an underfloor post end adapted to engage the underfloor and a support post central section extending upwardly from the underfloor post end and being adapted to engage the support passage and support the pan section of the trench pan.

9. The trench raceway of claim 8 wherein the support post central section includes a threaded post section threading into a matingly threaded post receiving section, and a post lock nut threaded on the threaded post section.

10. The trench raceway of claim 9 further comprising post insulation means for insulating the cover plate from the support post, and pedestal insulation means for insulating each support pedestal from the respective lip support section supported by the pedestal.

11. The trench raceway of claim 10 wherein each lip support section further includes lip insulation means for insulating the lip support section from the side of the access passage against which the lip support section is adjacent.

12. The trench raceway of claim 11 further comprising in combination a partition parallel to the first access side and transversely extending between the pan section and the cover plate, dividing the trench raceway into at least two wireway cavities.

13. The trench raceway of claim 12 further comprising at least one removable spacer bar mountable upon between the first and second lip support sections to transversely extend and maintain the distance between the first and second lip support sections during installation of the trench pan.

14. The trench raceway of claim 13 wherein the lip support section has a continuous screw slot along its axial length, providing screw means for securing the cover plate to the lip support section along the axial length of the support section.

15. The trench raceway of claim 14, wherein each lip insulation means includes a resilient, angled trim section between the cover plate and access side adjacent to which the lip insulation means is mounted.

16. The trench raceway of claim 7 wherein the access passage portion of each support pedestal includes a planar access panel abutment and a support lip spacer abutting and intermediate the panel abutment and support lip section supported by the access passage portion of each support pedestal.

17. The trench raceway of claim 15 wherein the access passage portion of each support pedestal includes a planar access panel abutment and a support spacer abutting and intermediate the panel abutment and support lip section supported by the access passage portion.

18. The trench raceway of claim 17 wherein, in each access passage portion, the lip support section, the support lip spacer, and the panel abutment cooperatively provide co-axial threading means for aligning and securing the position of the support pedestal with respect to the access passage and undersurface.

19. The trench raceway of claim 18 wherein each lip spacer is a rigid insulator and comprises at least a portion of the pedestal insulating means.

20. The trench raceway as claimed in claim 7 further comprising a cover plate mounted on the trench pan and extending between the first and second lip support sections of the first and second support pedestals, respectively.

21. The trench raceway as claimed in claim 8 further comprising a cover plate engaging end secured to the support post central section opposite of the underfloor post end and being adapted to engage and support a cover plate.

22. The trench raceway as claimed in claim 8 wherein the pan support post is adjustable.

23. A trench raceway for use with an access floor of the type supported above an underfloor by a plurality of support pedestals, the access floor defining an access passage having first and second opposing access sides, the plurality of support pedestals including first and second sets of pedestals disposed along the first and second sides of the access passage, respectively, each pedestal in the first and second sets of pedestals including a floor support portion underlying and supporting the access floor and an access portion extending into the access passage, the trench raceway comprising:

A) a trench pan adapted to be positioned in the access passage and supported by the first and second sets of support pedestals positioned adjacent to the first and second access sides, the trench pan having a first side wall and a second side wall with lower, and upper edges and a pan section extending between the lower edges of the first and second side walls, each side wall having a respective lip support section extending outwardly from its upper edge adapted to overlay and be supported by the access passage portions of the first and second sets of support pedestals, the pan section of the trench pan further having a pan support passage centrally disposed in the pan section; and B) an adjustable pan support having an undersurface engaging end, a cover plate engaging end, and a pan support intermediate the undersurface engaging end and the cover plate engaging end and mounted in the pan support passage to supportingly engage the pan section of the trench pan.

24. The trench raceway as claimed in claim 23 wherein the depth of the trench pan is less than the distance between the access surface and the undersurface to provide at least a first wire passage between the pan section and the undersurface and a second wire passage within the interior of the pan section of the trench pan.

* * * * *